United States Patent
Jarcy

(10) Patent No.: US 7,298,711 B1
(45) Date of Patent: Nov. 20, 2007

(54) ECHO CANCELLATION IN A COMMUNICATION DEVICE

(75) Inventor: Michael J. Jarcy, Tustin, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1098 days.

(21) Appl. No.: 10/253,668

(22) Filed: Sep. 23, 2002

(51) Int. Cl.
*H04B 3/20* (2006.01)

(52) U.S. Cl. ............... 370/286; 375/222; 375/254; 375/350; 379/406.01; 379/406.06

(58) Field of Classification Search ............ 370/286, 370/287, 288, 289, 290, 291, 292; 375/222, 375/254, 350; 379/406.1, 406.02, 406.03, 379/406.05, 406.06, 406.15, 406.01
See application file for complete search history.

(56) References Cited

U.S. PATENT DOCUMENTS 4,669,116 A * 5/1987 Agazzi et al. ......... 379/406.08
5,680,450 A * 10/1997 Dent et al. ............. 379/406.08
6,147,979 A * 11/2000 Michel et al. ............ 370/292
6,522,688 B1 * 2/2003 Dowling .................. 375/222

* cited by examiner

*Primary Examiner*—Chi Pham
*Assistant Examiner*—Shick Hom
(74) *Attorney, Agent, or Firm*—Farjami & Farjami LLP

(57) ABSTRACT

According to one exemplary embodiment, a communication device comprises a line driver, where the line driver provides an output signal. The communication device further comprises a digital echo canceller module coupled to the line driver, where the digital echo canceller module receives an echo reference signal determined by the output signal of the line driver, where the echo canceller module outputs an echo cancellation signal, and where the echo cancellation signal is capable of canceling linear and non-linear components of a composite signal. The communication device further comprises a summation module coupled to the digital echo canceller module, where the summation module receives the echo cancellation signal and the composite signal, and where the composite signal comprises a received signal and the linear and non-linear echo components. The summation module is configured to subtract the echo cancellation signal from the composite signal and to output the received signal.

17 Claims, 2 Drawing Sheets

ECHO CANCELLATION IN A COMMUNICATION DEVICE

BACKGROUND OF THE INVENTION

1. Field of the Invention

The present invention is generally related to the field of communication devices. More particularly, the present invention is related to echo cancellation in communication devices.

2. Related Art

The increasing demand for high-speed Internet connectivity has in turn increased the demand for various communication devices such as modems, and in particular for modems utilizing digital subscriber line ("DSL") technology which provides high-speed transmission of voice, video, and data information over existing copper telephone lines. Although the DSL modem is used merely as an example in the present application to illustrate shortcomings of the existing art, such shortcomings and the solutions set forth by the present invention, are also applicable to other communication devices.

DSL technology utilizes a DSL modem to achieve data speed from 128 Kbps to 8 Mbps and higher over an ordinary telephone line. During operation, the DSL modem utilizes the same line for both transmitting and receiving information. As a result, the signal transmitted by a line driver in the DSL modem can encounter discontinuities in the line, which can cause part of the transmitted signal to reflect or echo back and interfere with a received signal. In an effort to eliminate interference to the received signal that is caused by the echo of the signal transmitted by the line driver, DSL modem manufacturers employ echo cancellation circuitry.

To achieve echo cancellation, DSL modem manufacturers typically employ a hybrid circuit comprising analog components. By utilizing a hybrid circuit, an echo reduction or attenuation of approximately 15.0 to 20.0 dB can be achieved. However, proper reception of the received signal requires that the signal strength of the echo be attenuated below the signal strength of the received signal. Thus, since the signal strength of the received signal can be approximately 80.0 dB below the signal strength of the transmitted signal, an echo reduction of 15.0 to 20.0 dB does not provide sufficient echo cancellation for proper reception of the received signal. Greater echo reduction can be achieved in an external hybrid circuit by utilizing very accurate components and very accurately matching the impedance of the line. However, very accurate components are costly and matching the impedance of the line to a required degree of accuracy is difficult to achieve.

To achieve further echo cancellation, DSL modem manufacturers utilize a digital echo canceller ("DEC") in the DSL modem. By utilizing a DEC, a desirable echo attenuation or reduction of approximately 80.0 dB can be achieved. However, the DEC is essentially a linear echo canceller and, as such, works very well as long as the line driver that transmits the output signal of the DSL modem is linear.

During actual operation, the signal transmitted by the line driver includes non-linear signal components, since linearity is difficult to achieve in a high power and high current device such as a line driver. As a result, the echo will include both linear and non-linear signal components. Thus, since the DEC is essentially a linear echo canceller, the DEC will only cancel the linear component of the echo. Since the hybrid circuit can reduce both the linear and non-linear components of the echo, the hybrid circuit can be utilized to attenuate the non-linear component of the echo. However, the hybrid circuit typically attenuates the non-linear component of the echo by only approximately 15.0 to 20.0 dB. Thus, the unattenuated portion of the non-linear component of the echo will be passed through to the decoder portion of the DSL modem as noise, which can undesirably interfere with reception of low level signals.

Although the DEC could be designed to cancel the non-linear portion of the echo, the complexity of the DEC would be greatly increased, since an exponentially increasing amount of digital circuitry would be required for each harmonic of the non-linear portion of the echo. As a result, the cost of the DEC would be undesirably increased.

Thus, there is a need in the art for a cost-effective system for cancellation of linear and non-linear echo components created by a line driver in a communication device, such as a DSL modem.

SUMMARY OF THE INVENTION

The present invention is directed to echo cancellation in a communication device. The present invention addresses and resolves the need in the art for a cost-effective system for cancellation of linear and non-linear echo components created by a line driver in a communication device, such as a DSL modem.

According to one exemplary embodiment, a communication device comprises a line driver or power amplifier, where the line driver or power amplifier provides an output signal. The communication device may be, for example, a DSL modem. The communication device further comprises a digital echo canceller module coupled to the line driver, where the digital echo canceller module receives an echo reference signal determined by the output signal of the line driver, where the echo canceller module outputs an echo cancellation signal, and where the echo cancellation signal is capable of canceling linear and non-linear components of a composite signal.

According to this exemplary embodiment, the communication device further comprises a summation module coupled to the digital echo canceller module, where the summation module receives the echo cancellation signal and the composite signal, and where the composite signal comprises a received signal and the linear and non-linear echo components. The summation module is configured to subtract the echo cancellation signal from the composite signal and to output the received signal. The communication device may further comprise an external hybrid module coupled to the line driver. Other features and advantages of the present invention will become more readily apparent to those of ordinary skill in the art after reviewing the following detailed description and accompanying drawings.

DETAILED DESCRIPTION OF THE INVENTION

The present invention is directed to echo cancellation in a communication device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
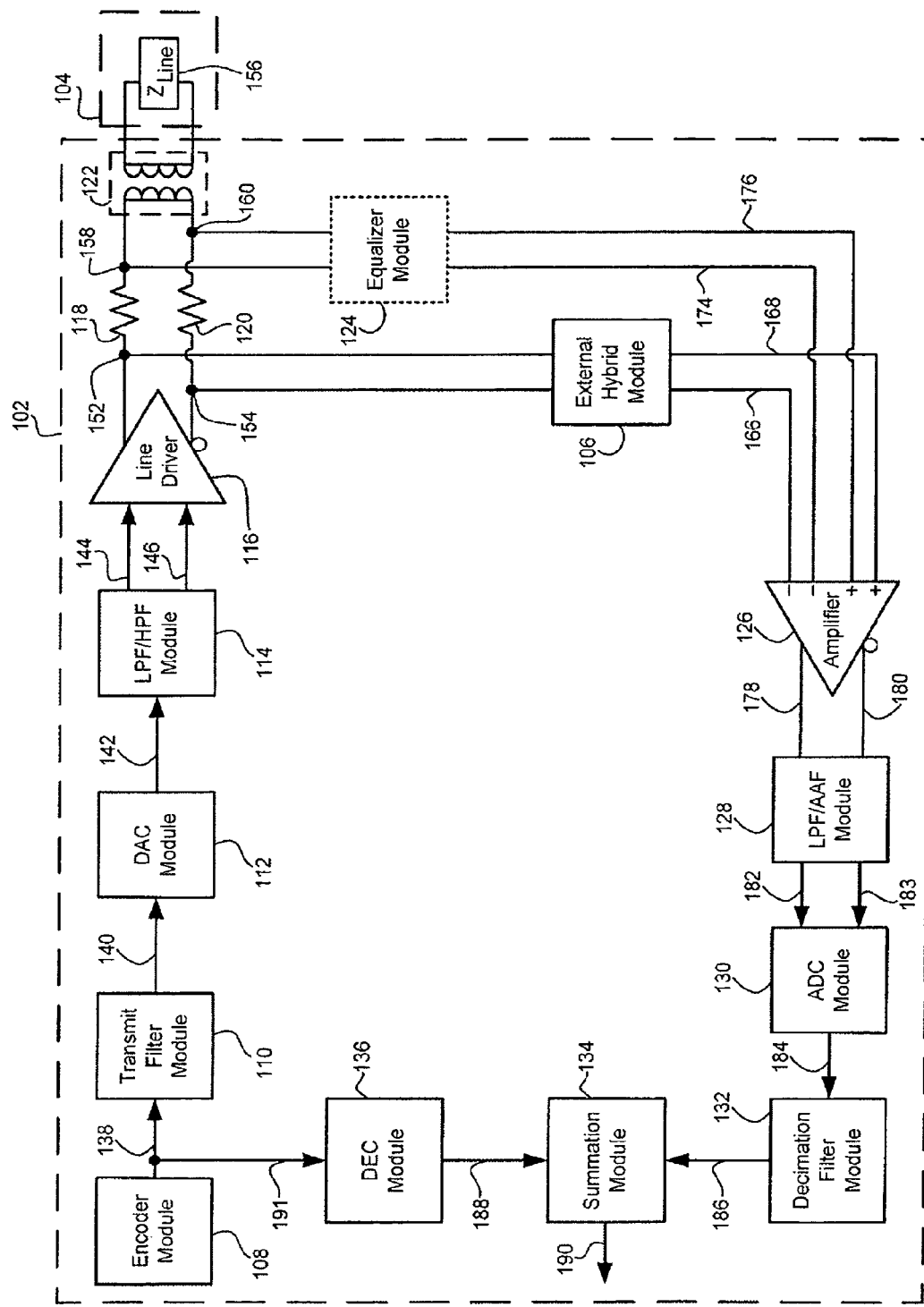
FIG. 1 illustrates a block diagram of a conventional exemplary DSL modem comprising a conventional exemplary echo cancellation system.

FIG. 1 shows a block diagram of an exemplary DSL modem, including a conventional exemplary echo cancellation system, coupled to a line. Conventional DSL modem 102 in FIG. 1 includes external hybrid module 106, encoder module 108, transmit filter module 110, digital to analog converter ("DAC") module 112, low pass filter ("LPF")/high pass filter ("HPF") module 114, line driver 116, resistors 118 and 120, transformer 122, equalizer module 124, amplifier 126, LPF/anti-aliasing filter ("AAF") 128, analog to digital converter ("ADC") module 130, decimation filter module 132, digital echo canceller ("DEC") module, 136 and Summation Module 134. The above modules included in conventional DSL modem 102, with the exception of external hybrid module 106, transformer 122 and resistors 118 and 120, may be situated in an integrated circuit ("IC") chip. Conventional DSL modem 102 also includes other modules not shown in FIG. 1 to preserve brevity.

As shown in FIG. 1, encoder module 108 is coupled to transmit filter module 110 and DEC module 136 via line 138. Encoder module 108 can be configured to convert data into code, and transmit filter module 110 can be configured to provide appropriate filtering of an encoded signal received from encoder module 108 via line 138. Transmit filter module 110 is coupled to DAC module 112 via line 140. Also shown in FIG. 1, DAC module 112 is coupled to LPF/HPF module 114 via line 142. DAC module 112 can be configured to convert a digital signal received from transmit filter module 110 into an analog signal. LPF/HPF module 114 receives an analog signal from DAC module 112 via line 142 and provides first and second outputs, respectively, to line driver 116 via lines 144 and 146. LPF/HPF module 114 can be configured to filter the analog signal received from DAC module 112 in a manner known in the art.

Further shown in FIG. 1, positive and negative outputs of line driver 116 are coupled to first terminals of resistors 118 and 120 at nodes 152 and 154, respectively. Line driver 116 can be configured to transmit a signal over line 104 via transformer 122 and can require, for example, up to 1.8 watts of power. Also shown in FIG. 1, second terminals of resistors 118 and 120, respectively, are coupled to a secondary winding of transformer 122 at nodes 158 and 160, and a primary winding of transformer 122 is coupled to line 104. Resistors 118 and 120 can be utilized to match the impedance of conventional DSL modem 102 to $Z_{line}$ 156, the impedance of line 104. Transformer 122 couples conventional DSL modem 102 to line 104 while providing isolation between conventional DSL modem 102 and line 104. Line 104 is utilized by conventional DSL modem 102 to communicate with a telephone company central office and typically comprises copper twisted-pair wire.

Also shown in FIG. 1, first and second inputs of external hybrid module 106 are coupled to nodes 152 and 154 and first and second outputs of external hybrid module 106 are coupled to first "+" and "−"inputs of amplifier 126 via lines 166 and 168, respectively. External hybrid module 106 comprises discrete analog components and can be configured to attenuate linear and non-linear echo components caused by line driver 116. External hybrid module 106 can attenuate linear and non-linear echo components by, for example, approximately 15.0 dB to 20.0 dB. Further shown in FIG. 1, first and second inputs of equalizer module 124 are coupled to nodes 158 and 160 and first and second outputs of equalizer module 124 are coupled to second "−" and "+" inputs of amplifier 126 via lines 174 and 176, respectively. Equalizer module 124 can be configured to counteract distortions, typically low pass filtering, caused by line 104 in a received signal. Equalizer module 124 is an optional module that is not utilized in some DSL modems.

Further shown in FIG. 1, first and second outputs, respectively, of amplifier 126 are coupled to LPF/AAF module 128 via lines 178 and 180. Amplifier 126 can be an automatic gain control ("AGC") amplifier that can be configured to appropriately adjust the gain of an inputted signal in a manner known in the art. LPF/AAF module 128 can be configured to prevent "aliasing noise" by appropriately filtering first and second outputs received from amplifier 126 via lines 178 and 180, respectively. By way of background, "aliasing noise" refers to distortion that is created when frequencies present in a sampled signal are greater than one-half the sample rate.

Also shown in FIG. 1, LPF/AAF module 128 is coupled to ADC module 130 via lines 182 and 183 and ADC module 130 is coupled to decimation filter module 132 via line 184. ADC module 130 can be configured to convert an analog signal inputted on lines 182 and 183 into a digital signal, which can be outputted on line 184. Decimation filter module 132 can be configured to eliminate unnecessary data points caused by over-sampling in ADC module 130. Further shown in FIG. 1, the output of decimation filter module 132 is coupled to summation module 134 via line 186 and the output of DEC module 136 is coupled to summation module 134 via line 188. DEC module 136 can be configured to receive a digital reference signal from encoder module 108 via line 191, process the digital signal, and output the digital signal on line 188 such that the outputted digital signal can cancel linear echo created by line driver 116. DEC module 136 can be, for example, a finite impulse response ("FIR") filter as known in the art, typically contained in a digital signal processor ("DSP"). Summation module 134 can be configured to subtract the linear echo cancellation signal received from digital echo canceller module 136 from a composite signal received from decimation filter module 132 and to provide an output signal on line 190, which is coupled to a decoder module (not shown in FIG. 1). The composite signal received from decimation filter module 132 includes a received signal and linear and non-linear echo components.

The operation of a conventional exemplary echo cancellation system is now discussed. As discussed above, signals outputted by line driver 116 can produce an echo, which can interfere with reception of signals received over line 104 at nodes 158 and 160. As a result of non-linearity in the operation of line driver 116, the echo includes linear and non-linear components. The linear and non-linear echo components are combined with received signals at nodes 158 and 160, and the resulting composite signals are inputted into amplifier 126 via lines 174 and 176. First and second outputs, respectively, of line driver 116 are coupled to first and second inputs of external hybrid module 106 via nodes 152 and 154. External hybrid module 106 can be configured to match $Z_{line}$ 156, i.e. the impedance of line 104, such that the magnitude and phase of signals on lines 166 and 168, respectively, closely match the magnitude and phase of composite signals on lines 174 and 176.

The signals outputted from hybrid module 106 on lines 166 and 168 are subtracted in amplifier 126 from the composite signals inputted on lines 174 and 176. The resulting composite signals outputted by amplifier 126 on lines 178 and 180 have linear and non-linear echo components that have been attenuated approximately 15.0 dB to 20.0 dB by external hybrid module 106. A composite digital signal is inputted into summation module 134 after processing by LPF/AAF module 128, ADC module 130, and decimation filter module 132. In summation module 134, the output from DEC module 136 on line 188 is subtracted from the composite digital signal, which comprises a receive signal and attenuated linear and non-linear echo components, on line 186, and a resulting signal is outputted on line 190. The output of DEC module 136 can be utilized to cancel only the linear echo component, since DEC module 136 is a linear echo canceller. As a result, the signal outputted on line 190 includes the received signal combined with a non-linear echo component that has been attenuated approximately 15.0 dB to 20.0 dB. In conventional DSL modem 102, the attenuated non-linear echo component is undesirably coupled to a decoder module (not shown in FIG. 1) via line 190 as noise, which can interfere with proper reception of the received signal.

Figure 2:
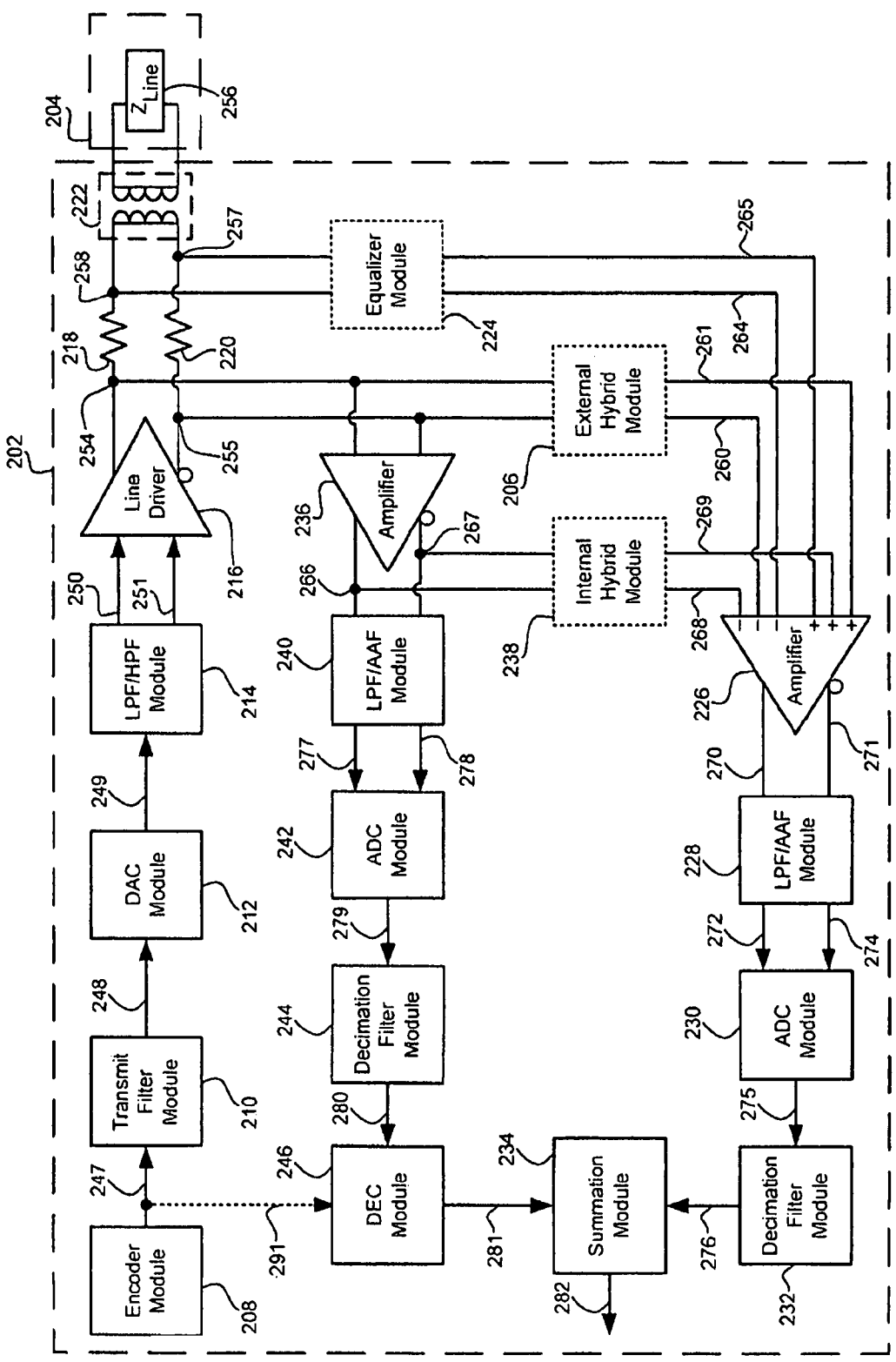
FIG. 2 illustrates a block diagram of an exemplary DSL modem comprising an exemplary echo cancellation system in accordance with one embodiment of the present invention.

FIG. 2 shows a block diagram of an exemplary DSL modem, including an exemplary echo cancellation system, coupled to a line in accordance with one embodiment of the present invention. Certain details and features have been left out of FIG. 2 that are apparent to a person of ordinary skill in the art. Although an exemplary DSL modem is described in the present embodiment to illustrate the present invention's echo cancellation system, the present invention also applies to other types of modems or communication devices that share bandwidth on a line or airwave for transmitting and receiving data as known in the art. DSL modem 202 includes external hybrid module 206, encoder module 208, transmit filter module 210, DAC module 212, LPF/HPF module 214, line driver 216, resistors 218 and 220, transformer 222, equalizer module 224, amplifiers 226 and 236, LPF/AAF modules 228 and 240, ADC modules 230 and 232, decimation filter modules 232 and 244, summation module 234, and DEC module 246. The above modules included in DSL modem 202, excluding external hybrid module 206, transformer 222, resistors 218 and 220, can be integrated in an IC chip. External hybrid module 206 comprises discrete analog components and, as such, is situated outside of an IC chip in DSL modem 202. DSL modem 202 also includes other modules not shown in FIG. 2 to preserve brevity.

As shown in FIG. 2, encoder module 208 is coupled to transmit filter module 210 via line 247. Encoder module 208 can be configured to convert data into code, and transmit filter module 210 can be configured to provide appropriate filtering of an encoded signal received from encoder module 208 via line 247. Transmit filter module 210 is coupled to DAC module 212 via line 248. Also shown in FIG. 2, DAC module 212 is coupled to LPF/HPF module 214 via line 249. DAC module 212 can be configured to convert a digital signal received from transmit filter module 210 into an analog signal. LPF/HPF module 214 can receive an analog signal from DAC module 212 via line 249 and can provide first and second outputs, respectively, to line driver 216 via lines 250 and 251.

Also shown in FIG. 2, first and second outputs of line driver 216 are coupled to first terminals of resistors 218 and 220 at nodes 254 and 255, respectively. As a result of non-linear operation of line driver 216, output signals at first and second outputs of line driver 216 at nodes 254 and 255 can include linear as well as non-linear components, such as harmonic distortion and noise. As discussed above, the linear and non-linear components, respectively, of the output signals of line driver 216 produce echo comprising linear and non-linear echo components. The linear and non-linear echo components can interfere with proper reception of received signals at nodes 258 and 257. Line driver 216 can be, for example, a switching D class line driver. In one embodiment, line driver 216 can provide active, or synthetic, impedance matching to reduce power consumption. The power requirement of line driver 216 can be, for example, approximately 0.9 watts.

Further shown in FIG. 2, second terminals of resistors 218 and 220, respectively, are coupled to the primary winding of transformer 222 at nodes 258 and 257. The echo discussed above is combined with signals received via line 204 to form composite signals at nodes 258 and 257. Thus, the composite signals at nodes 258 and 257 comprise of received signals combined with both linear and non-linear echo components. Resistors 218 and 220 are utilized to match the impedance of DSL modem 202 to $Z_{line}$ 256, i.e. the impedance of line 204. Resistors 218 and 220, respectively, effectively form voltage dividers that cause the amplitude of signals at nodes 254 and 255 to be higher than the amplitude of signals at nodes 258 and 257. Transformer 222 can be utilized to adjust the amplitude of signals outputted to the line 204. Line 204 is utilized by DSL modem 202 to communicate with a telephone company central office. Line 204 typically comprises copper twisted-pair wire and has impedance $Z_{line}$ 256 as discussed above.

Further shown in FIG. 2, first and second inputs of external hybrid module 206 are coupled to nodes 254 and 255, respectively, and first and second outputs of external hybrid module 206 are coupled to first "−" and "+" inputs of amplifier 226 via lines 260 and 261. External hybrid module 206 is an optional module that operates in a similar manner as external hybrid module 106 in FIG. 1 discussed above. In one embodiment, external hybrid module 216 is not utilized. Also shown in FIG. 2, first and second inputs of equalizer module 224 are coupled to nodes 258 and 257, respectively, and first and second outputs of equalizer module 224 are coupled to second "−" and "+" inputs of amplifier 226 via lines 264 and 265. Equalizer module 224 is an optional module that can be configured to counteract distortions, typically low pass filtering, caused by line 204 in signals received at nodes 258 and 257. In one embodiment, equalizer module 224 is not utilized.

Also shown in FIG. 2, first and second inputs of amplifier 236 are coupled to nodes 254 and 255, and first and second outputs of amplifier 236 are coupled to LPF/AAF module 240 and internal hybrid module 238 at nodes 266 and 267. Amplifier 236 can be configured to appropriately adjust the gain of signals inputted at first and second inputs of amplifier 236 and can be, for example, a variable gain amplifier ("VGA") or other appropriate amplifier as known in the art.

Further shown in FIG. 2, first and second outputs of internal hybrid module 238 are coupled to third "−" and "+" inputs of amplifier 226 via lines 268 and 269. Internal hybrid module 238 comprises an optional portion of external hybrid module 206 and can be integrated in an IC chip in DSL modem 202. Internal hybrid module 238 can be configured to tune or adjust external hybrid module 206. In one embodiment, internal hybrid module 238 is not utilized. Amplifier 226 is configured to appropriately adjust the gain of signals inputted at first, second, and third "+" and "−" inputs of amplifier 226. Amplifier 226 can be, for example, an automatic gain control ("AGC") amplifier or other appropriate amplifier as known in the art.

Also shown in FIG. 2, first and second outputs of amplifier 226 are coupled to LPF/AAF module 228 via lines 270 and 271, respectively, and LPF/AAF module 228 is coupled to ADC module 230 via lines 272 and 274. LPF/AAF module 228 can be configured to prevent "aliasing noise" discussed above by appropriately filtering first and second outputs received from amplifier 226 via lines 270 and 271. ADC module 230 can be configured to convert analog signals inputted on lines 272 and 274 into a digital signal, which ADC module 230 outputs to decimation filter module 232 on line 275. Further shown in FIG. 2, decimation filter module 232 is coupled to summation module 234 via line 276. Decimation filter module 232 can be configured to eliminate unnecessary data points that are introduced in a digital signal as a result of over-sampling in ADC module 130.

Further shown in FIG. 2, LPF/AAF module 240 are coupled to ADC module 242 via lines 277 and 278, ADC module 242 is coupled to decimation filter module 244 via line 279, and decimation filter module 244 is coupled to DEC module 246 via line 280. In one embodiment, LPF/AAF module 240, ADC module 242, and decimation filter module 244, respectively, are substantially equal to LPF/AAF module 228, ADC module 230, and decimation filter module 232 discussed above. It is noted that LPF/AAF module 240, ADC module 242, and decimation filter module 244 are referred to as a "first group of processing modules" and LPF/AAF module 228, ADC module 230, and decimation filter module 232 are referred to as a "second group of processing modules" in the present application. In one embodiment, ADC modules 230 and 242 can be replaced by a single multiplexed ADC module to achieve reduced chip size and cost. Similarly, in one embodiment, decimation filter modules 244 and 232 can be replaced by a single multiplexed decimation filter to achieve reduced chip size and cost.

Also shown in FIG. 2, DEC module 246 is coupled to summation module 234 via line 281. DEC module 246 can be configured to cancel both linear and non-linear echo components by utilizing information included in an echo reference signal received from decimation filter module 244 via line 280. The echo reference signal includes information determined by signals outputted by line driver 216 at nodes 254 and 255. DEC module 246 can be, for example, a FIR filter or other appropriate filter as known in the art. DEC module 246 can be a linear DEC module that can be implemented in a DSP or other appropriate processor as known in the art. DEC module 246 can also be configured to receive an optional training signal outputted by encoder module 208 via line 291. Summation module 234 can be configured to subtract a digital echo cancellation signal outputted by DEC module 246 on line 281 from a digital composite signal outputted by decimation filter module 232 on line 276. Summation module 234 can be further configure to provide an output signal to a decoder module (not shown in FIG. 2) on line 282.

The operation of the invention's echo cancellation system is now discussed. Composite signals at nodes 258 and 257, which include received signals combined with linear and non-linear echo components, are inputted into amplifier 226 on lines 264 and 265, respectively. Output signals of line driver 216 at nodes 254 and 255, which include linear and non-linear echo components, are attenuated by external hybrid module 206 by approximately 15.0 dB to 20.0 dB and outputted to amplifier 226 via lines 260 and 261. The output signals at nodes 254 and 255 are also adjusted by amplifier 236, inputted into internal hybrid module 238, and outputted to amplifier 226 via lines 268 and 269. Internal hybrid module 238 is utilized to fine tune the transfer function of external hybrid module 206. In amplifier 226, signals outputted by external hybrid module 206 are subtracted from composite signals inputted into amplifier 226 on lines 264 and 265, and composite signals are outputted on lines 270 and 271 comprising received signals combined with linear and non-linear echo components that have been attenuated by approximately 15.0 dB to 20.0 dB. The composite signals are processed by LPF/AAF module 228, ADC module 230, and decimation filter module 232 to form a digital composite signal, which is inputted into summation module 234 via line 276.

The output signals of line driver 216, which include linear and non-linear components, are coupled to amplifier 236 at nodes 254 and 255, respectively. Amplifier 236, LPF/AAF module 240, ADC module 242, and decimation filter module 244 process the output signals of line driver 216 and form an echo reference signal, which is inputted into DEC module 246 via line 280. The echo reference signal is a digital signal that is determined by the line driver output signals at nodes 254 and 255.

As discussed above, DEC module 246 can be configured to provide cancellation of both linear and non-linear echo components utilizing the echo reference signal received via line 280. In summation module 234, a digital echo cancellation signal received from DEC module 246 on line 281 is subtracted from a digital composite signal comprising a received signal and linear and non-linear echo components received from decimation filter module 232 on line 276. As a result of subtracting the digital echo cancellation signal from the received composite signal, the linear and non-linear echo components are both canceled and the received signal is outputted on line 282.

Thus, by utilizing an echo reference signal that contains actual linear and non-linear line driver output information and inputting the echo reference signal into a DEC module, the present invention advantageously achieves effective cancellation of both linear and non-linear echo components. In contrast, a conventional echo cancellation system utilized in exemplary DSL modem 102 in FIG. 1 provides effective cancellation of only a linear echo component. In the conventional echo cancellation system in FIG. 1, since a non-linear echo component is only attenuated by approximately 15.0 dB to 20.0 dB, the non-linear echo component can interfere with proper reception of a received signal.

Furthermore, by providing linear and non-linear echo cancellation in a DEC module in the digital domain, the present invention can utilize a linear DEC module, which reduces cost and complexity of the DEC module and consumes less area on an IC chip. Also, the present invention achieves effective linear and non-linear echo cancellation without requiring a complex external hybrid module utilizing very accurate and expensive components. Additionally, by providing effective linear and non-linear echo cancellation, the present invention allows utilization of a line driver having reduced linearity and, thus, reduced power requirements compared to a line driver utilized in a DSL modem comprising a conventional echo cancellation system. The present invention can utilize a line driver having a power requirement of only less than 0.9 watts, for example, whereas exemplary DSL modem 102 in FIG. 1, which comprises a conventional echo cancellation system, requires a line drive having a power requirement of up to 1.8 watts.

It is appreciated by the above detailed description that the present invention achieves effective linear and non-linear echo cancellation in a communication device. From the above description of the invention it is manifest that various techniques can be used for implementing the concepts of the present invention without departing from its scope. Moreover, while the invention has been described with specific reference to certain embodiments, a person of ordinary skills in the art would appreciate that changes can be made in form and detail without departing from the spirit and the scope of the invention. For example, it is appreciated that the present invention may be also be applied to various types of modems or communication devices other than DSL modems. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, echo cancellation in a communication device has been described.

The invention claimed is:

1. A communication device comprising:
    a line driver, said line driver configured to transmit an output signal, wherein said output signal includes linear and non-linear echo components;
    a first group of processing modules, said first group of processing modules receiving said output signal including said linear and non-linear echo components from said line driver, and said first group of processing modules outputting an echo reference signal based on said output signal;
    a digital echo canceller module receiving said echo reference signal, said echo canceller module outputting an echo cancellation signal based on said echo reference signal for canceling said linear and non-linear echo components of a composite signal;
    a second group of processing modules, said second group of processing modules receiving said output signal including said linear and non-linear echo components from said line driver, and said second group of processing modules outputting said composite signal utilizing said output signal;
    a summation module coupled to said digital echo canceller module, said summation module receiving said echo cancellation signal and said composite signal, said summation module being configured to subtract said echo cancellation signal from said composite signal to cancel said linear and non-linear echo components from said composite signal.

2. The communication device of claim 1 wherein said first group of processing modules comprises a filter module.

3. The communication device of claim 1 wherein said first group of processing modules comprises an analog to digital converter module.

4. The communication device of claim 1 wherein said first group of processing modules comprises a decimation filter module.

5. The communication device of claim 1 wherein said second group of processing modules comprises a filter module.

6. The communication device of claim 1 wherein said second group of processing modules comprises an analog to digital converter module.

7. The communication device of claim 1 wherein said second group of processing modules comprises a decimation filter module.

8. The communication device of claim 1 wherein said communication device comprises a modem.

9. The communication device of claim 8 wherein said modem comprises a DSL modem.

10. A method of echo cancellation in a communication device, said method comprising steps of:
    outputting a line driver output signal including linear and non-linear echo components;
    receiving said output signal including said linear and non-linear echo components from said line driver using a first group of processing modules;
    generating an echo reference signal based on said output signal using said first group of processing modules;
    receiving said echo reference signal by a digital echo canceller module coupled to said first group of processing modules;
    outputting an echo cancellation signal based on said echo cancellation signal, using said echo canceller module for canceling said linear and non-linear echo components of a composite signal;
    receiving said output signal including said linear and non-linear echo components from said line driver using a second group of processing modules;
    outputting said composite signal utilizing said output signal using said second group of processing modules;
    subtracting said echo cancellation signal from said composite signal to cancel said linear and non-linear echo components from said composite signal.

11. The method of claim 10 wherein said communication device comprises a modem.

12. The method of claim 10 wherein said first group of processing modules comprises a filter module.

13. The method of claim 10 wherein said first group of processing modules comprises an analog to digital converter module.

14. The method of claim 10 wherein said first group of processing modules comprises a decimation filter module.

15. The method of claim 10 wherein said second group of processing modules comprises a filter module.

16. The method of claim 10 wherein said second group of processing modules comprises an analog to digital converter module.

17. The method of claim 10 wherein said second group of processing modules comprises a decimation filter module.

* * * * *